United States Patent
Käfer

(10) Patent No.: US 12,456,372 B2
(45) Date of Patent: Oct. 28, 2025

(54) METHOD FOR DETERMINING AND OUTPUTTING A DRIVING SPEED ADAPTED TO A DRIVING SITUATION

(71) Applicant: MERCEDES-BENZ GROUP AG, Stuttgart (DE)

(72) Inventor: Eugen Käfer, Renningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 151 days.

(21) Appl. No.: 18/288,590

(22) PCT Filed: Mar. 18, 2022

(86) PCT No.: PCT/EP2022/057169
§ 371 (c)(1),
(2) Date: Oct. 27, 2023

(87) PCT Pub. No.: WO2022/228777
PCT Pub. Date: Nov. 3, 2022

(65) Prior Publication Data
US 2024/0212498 A1    Jun. 27, 2024

(30) Foreign Application Priority Data
Apr. 30, 2021  (DE) ............ 10 2021 002 295.5

(51) Int. Cl.
*G08G 1/0967*   (2006.01)
*G08G 1/01*     (2006.01)
(Continued)

(52) U.S. Cl.
CPC ..... *G08G 1/096791* (2013.01); *G08G 1/0112* (2013.01); *G08G 1/0141* (2013.01);
(Continued)

(58) Field of Classification Search
None
See application file for complete search history.

(56) References Cited

U.S. PATENT DOCUMENTS

| | | | |
|---|---|---|---|
| 2013/0226622 | A1 | 8/2013 | Adamson et al. |
| 2014/0236483 | A1* | 8/2014 | Beaurepaire ....... G01C 21/3685 701/533 |

(Continued)

FOREIGN PATENT DOCUMENTS

| | | |
|---|---|---|
| DE | 102011080761 A1 | 2/2013 |
| DE | 102015223176 A1 | 5/2017 |

(Continued)

OTHER PUBLICATIONS

International Search Report and Written Opinion mailed Jun. 15, 2022 in related/corresponding International Application No. PCT/EP2022/057169.

(Continued)

*Primary Examiner* — Amelia Vorce
(74) *Attorney, Agent, or Firm* — PATENT PORTFOLIO BUILDERS PLLC

(57) ABSTRACT

A driving speed of vehicles adapted to a driving situation is determined when an object located next to a roadway of a vehicle obscures at least portions of a bend lying ahead of the vehicle. Detected speed behavior of other vehicles in the region of the bend, in which a driving speed of the other vehicles in each case falls below a predetermined locally permissible maximum speed for negotiating the bend, is transmitted to an external computer unit. A position of the obscuring object is transmitted to the computer unit, which checks for a causal relationship between the detected speed behavior of the other vehicles and the obscuring object. If there is a causal relationship, an average driving speed for negotiating the bend is stored as a speed recommendation (Continued)

and made available at least to vehicles coupled to the computer unit for data exchange.

4 Claims, 1 Drawing Sheet

(51) Int. Cl.
  *G08G 1/052* (2006.01)
  *G08G 1/16* (2006.01)
  *H04W 4/46* (2018.01)
(52) U.S. Cl.
  CPC ........... *G08G 1/0145* (2013.01); *G08G 1/052* (2013.01); *G08G 1/096725* (2013.01); *G08G 1/162* (2013.01); *G08G 1/166* (2013.01); *H04W 4/46* (2018.02)

(56) References Cited

U.S. PATENT DOCUMENTS

| | | | | |
|---|---|---|---|---|
| 2016/0379484 | A1* | 12/2016 | Kashiwai | G08G 1/0129 340/933 |
| 2017/0337816 | A1* | 11/2017 | Lu | G08G 1/096758 |
| 2018/0151066 | A1* | 5/2018 | Oba | G05D 1/247 |
| 2018/0194352 | A1* | 7/2018 | Avedisov | G08G 1/163 |
| 2019/0027036 | A1* | 1/2019 | Mishina | B60W 30/0956 |
| 2019/0196485 | A1* | 6/2019 | Li | B60W 30/0956 |
| 2020/0302793 | A1* | 9/2020 | Oyama | G08G 1/0112 |
| 2021/0027622 | A1* | 1/2021 | Jiao | G08G 1/0112 |
| 2021/0312806 | A1* | 10/2021 | Kulakov | H04W 4/46 |
| 2022/0324438 | A1* | 10/2022 | Liu | B60W 50/035 |
| 2023/0143805 | A1* | 5/2023 | Baba | G08G 1/16 701/301 |
| 2024/0242612 | A1* | 7/2024 | Senninger | G08G 1/125 |

FOREIGN PATENT DOCUMENTS

| | | |
|---|---|---|
| DE | 102020003073 B3 | 11/2021 |
| EP | 2861474 B1 | 11/2018 |
| JP | 2006163942 A | 6/2006 |

OTHER PUBLICATIONS

Office Action created Nov. 22, 2021 in related/corresponding DE Application No. 10 2021 002 295.5.

* cited by examiner

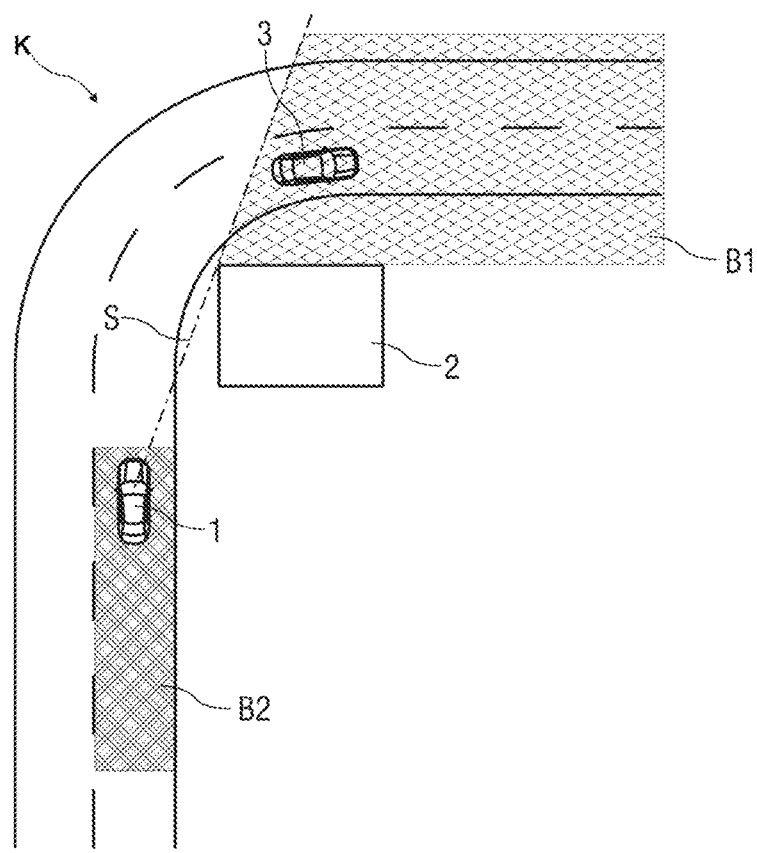

METHOD FOR DETERMINING AND OUTPUTTING A DRIVING SPEED ADAPTED TO A DRIVING SITUATION

BACKGROUND AND SUMMARY OF THE INVENTION

Exemplary embodiments of the invention relate to a method for determining and outputting a driving speed of vehicles adapted to a driving situation, wherein an object located next to a roadway of a vehicle and obscuring, at least in portions, a bend lying ahead of the vehicle is detected on the basis of detected signals of a surroundings sensor system.

DE 10 2020 003 073.4 describes a method and a device for automated driving operation of a vehicle. The method provides that, in the case of a bend lying ahead of the vehicle, a visibility restriction, expected based on the bend, of at least one detection unit of a surroundings sensor system directed in the direction of travel of the vehicle is determined, and, if it is determined that a visibility of the at least one detection unit falls below a predefined threshold value, a lane change of the vehicle to an outside lane of the bend is automatically performed, provided that there is an outside lane of the bend, wherein preferably there is no legal requirement to drive on the right.

Furthermore, DE 10 2015 223 176 A1 discloses a driver assistance system for a vehicle with surroundings sensors detecting the surroundings of the vehicle by means of sensors, and with a data processing unit that evaluates sensor data of the surroundings sensors to detect obstacles in the vehicle surroundings. In addition, a method for detecting occlusion areas in the vehicle surroundings is disclosed. The method provides that sensor data generated by the surroundings sensors are evaluated for detecting obstacles in the vehicle surroundings of the vehicle. In addition, occlusion areas that are occluded by the detected obstacles and restrict a field of view of optical surroundings sensors of the vehicle are calculated as a function of the detected obstacles.

Exemplary embodiments of the invention are directed to a method for determining and outputting a driving speed adapted to a driving situation for a vehicle.

A method for determining and outputting a driving speed of vehicles adapted to a driving situation provides that an object located next to a lane of a vehicle and obscuring, at least in portions, a bend lying ahead of the vehicle is detected based on detected signals of a surroundings sensor system. According to the invention, detected speed behavior of other vehicles in the region of the bend, in which a driving speed of the other vehicles in each case falls below a predetermined locally permissible maximum speed for negotiating the bend, is transmitted to a computer unit, which is external to the vehicle and which is coupled to the vehicle for data exchange. In addition, a position of the obscuring object is transmitted to the computer unit. The computer unit checks for a causal relationship between the detected speed behavior of the other vehicles and the obscuring object and, if there is a causal relationship between the speed behavior of the other vehicles and the obscuring object, an average driving speed determined from the driving speeds of the other vehicles for negotiating the bend is stored as a speed recommendation in a digital map and made available at least to vehicles that are coupled to the computer unit for data exchange.

By applying the method, a vehicle user to whom the speed recommendation is output in the vehicle learns a speed recommendation output according to the situation and, if necessary, a speed control in a driving situation with a comparatively unusual occlusion of at least one bend portion. In this case, the speed recommendation results from previously observed speed profiles of other vehicles that are transmitted to the central computer unit.

Thus, with a speed control of their vehicle resulting from the speed recommendation, the vehicle user also learns an adapted driving style of their vehicle in surroundings unknown to them in the event of a visual obscuration, whereby a potential for a critical subsequent situation, for example due to a non-visible pedestrian stepping onto a roadway in the bend through the obscuring object, is reduced.

The average driving speed is thus determined based on the determined speed profiles of the other vehicles. An average is therefore formed. The average driving speed is therefore between the locally permissible maximum speed for negotiating the bend and the driving speed at which the other vehicles negotiate the bend because of the visual obscuration. In particular, the bend can be negotiated appropriately and safely when using the speed recommendation, i.e., the average driving speed. It is still possible to react to a critical situation, for example to a refuse vehicle that has stopped in the bend and/or to a person standing on a roadway in the bend.

In one embodiment of the method, the causal relationship between the speed profiles of the other vehicles and the position of the obscuring object is checked taking into account the locally permissible maximum speed for negotiating the bend and a driving speed for safely negotiating the bend. In particular, due to the visual obscuration caused by the object, the other vehicles drive at a significantly lower speed than is required for negotiating the bend.

In a further embodiment, the average driving speed for negotiating the bend is fed to an assistance system for automated driving operation of at least the vehicles that are coupled to the computer unit for data exchange. This means that the assistance system automatically uses the average driving speed for automated driving operation, so that an instantaneous driving speed can be gradually reduced when approaching the bend and thus abrupt braking due to visual obscuration can be largely excluded.

In a further possible embodiment, when a vehicle coupled to the computer unit for data exchange approaches the bend in automated driving operation, an indication of a subsequent reduction of a current driving speed of the vehicle is output therein. Thus, a vehicle user of this vehicle is informed about the upcoming reduction of the driving speed. In this way, a false conclusion of the vehicle user based on the decreasing driving speed, for example that a defect is present, can be avoided to the greatest possible extent.

In order to make the speed recommendation for negotiating the bend with at least partial visual obscuration by the obscuring object accessible to other vehicles, in a possible development of the method, in the region of the bend, the speed recommendation is transmitted by means of vehicle-to-vehicle communication to other vehicles in the surroundings of a vehicle coupled to the computer unit for data exchange. As a result of the fact that these vehicles then negotiate the bend at the average driving speed, a traffic flow in the region of this bend can be optimized, since these vehicles, due to the visual obscuration, do not negotiate the bend at a comparatively low driving speed that is lower than the average driving speed, as would be the case without an existing speed recommendation.

Exemplary embodiments of the invention are explained in greater detail below with reference to a drawing.

BRIEF DESCRIPTION OF THE DRAWING FIGURE

In the drawing:

The sole FIGURE shows schematically a portion of a roadway with a vehicle approaching a partially obscured bend.

DETAILED DESCRIPTION

The sole FIGURE shows a portion of a roadway F with a bend K, wherein the course of the roadway is obscured for a vehicle 1 approaching the bend K. A visual obscuration caused to a vehicle user of the vehicle 1 results from an object 2, for example a house, standing comparatively close to an edge of the roadway F on the inside of the bend. For example, the house is a listed half-timbered house that may not be demolished. It is also possible that the roadway F has been widened in the direction of the object 2 and that the object 2 is therefore very close to the roadway F.

A line of sight S of the vehicle user shows that a region B not visible to the vehicle user is comparatively large due to the object 2.

In general, it is known that there are numerous influences as to why certain portions of road are travelled at a lower driving speed than, for example, a course of a bend K allows and/or a permissible maximum speed allows.

Such an object 2 can be the reason for a relatively critical situation when a vehicle 1 enters the bend K at a relatively high driving speed, since, for example, a refuse vehicle and/or a pedestrian crossing the roadway F may be present in the region that is not visible to the vehicle user. According to the present exemplary embodiment, another vehicle 3 driving ahead of the vehicle 1 is obscured by the object 2.

For this reason, a vehicle user is more or less forced to reduce their current driving speed for negotiating the bend K, in particular to avoid such a critical situation. In doing so, the current driving speed is often reduced in such a way that the current driving speed for negotiating the bend falls below a maximum speed permitted for this portion of the roadway F as well as a driving speed for safely negotiating the bend K.

In order to assist a vehicle user in a vehicle 1 driving towards such a bend K with a non-visible region B1 with regard to a selection of an appropriate driving speed for negotiating the bend K, a method described below is provided.

The vehicle 1 approaching the bend K is a so-called system vehicle and is coupled, for data exchange, to a computer unit that is not shown in greater detail. The vehicle 1 belongs to a vehicle fleet, for example of a vehicle manufacturer.

The vehicle 1 comprises a surroundings sensor system with a number of detection units arranged in and/or on the vehicle 1, which continuously detect signals during driving operation of the vehicle 1. The surroundings of the vehicle 1 and objects 2 located in it are detected based on the detected signals.

Thus, in addition to the object 2 obscuring the view of the vehicle user, other vehicles 3, not shown in greater detail, in particular vehicles driving ahead, are also detected based on detected signals from the surroundings sensor system.

Based on the detected signals in relation to the vehicles 3 travelling ahead, a corresponding speed behavior, i.e., a change of a current driving speed, in particular a reduction of the driving speed, can be determined. The other vehicles 3, which may also be part of the vehicle fleet, change their current speed when approaching the bend K, in particular in a further region B2 of the carriageway F shown by hatching.

Based on the detected speed behavior of the other vehicles 3, a criticality can be derived due to the visual obscuration. For this purpose, a speed behavior in the further region of the object 2 of a multitude of other vehicles 3 is determined.

The speed behavior of other vehicles 3 observed by sensors in relation to the further region B2 before entering the bend K is transmitted to the central computer unit connected to the vehicle 1. To achieve a statistically meaningful sample for evaluating the speed behavior, these are detected by several vehicles 1 belonging to the vehicle fleet and transmitted to the computer unit coupled for data exchange. In addition, a position of the object 2 obscuring the view is transmitted to the computer unit.

Based on the transmitted speed behavior and the position of the object 2, a causal relationship between the speed behavior of the other vehicles 3 and the object 2 is checked. In particular, the speed behavior of the other vehicles 3 is statistically evaluated taking into account the locally permissible maximum speed for negotiating the bend K and taking into account the driving speed for safely negotiating the bend K. This is used to determine whether there is a causal relationship between the observed reduction in the driving speed of the other vehicles 3 and the object 2 obscuring the view.

If it is determined that there is a causal relationship between the observed speed behavior of the other vehicles 3 and the object 2 obscuring the view, then an average driving speed determined on the basis of the speed behavior is determined as a speed recommendation for negotiating the bend K.

This speed recommendation is then stored in a digital map that is displayed in the vehicles 1 of the vehicle fleet that are coupled to the computer unit for data exchange. In particular, the speed recommendation can be output in the form of a symbol, for example a recommended speed, on a display unit of the vehicle 1 in question, in which the map is displayed. It is also conceivable that the speed recommendation is output as a voice message and/or in another suitable form in the vehicle 1.

In one embodiment of the method, such speed recommendations are fed as speed profiles to assistance systems of the vehicle 1 which access them. In this way, such observations can be communicated to a vehicle user and/or the speed recommendation is used for speed control of the vehicle 1, in particular in automated driving operation. For example, when approaching the bend in automated driving operation, an indication of a subsequent reduction in the current driving speed of the vehicle 1 can be output therein.

Furthermore, it can be provided that the speed recommendation available to the vehicles in the vehicle fleet is transmitted by means of vehicle-to-vehicle communication to other vehicles 3 located in the vicinity of one of the vehicles 1, for example to vehicles travelling ahead.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the FIGURES enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method comprising:
   detecting, based on detected signals of a surroundings sensor system of a vehicle, an object located next to a roadway of the vehicle and obscuring, at least in portions, a bend lying ahead of the vehicle;
   transmitting, from the vehicle to a computer unit that is external to the vehicle and that is coupled to the vehicle for data exchange, detected speed behavior of other vehicles in a region of the bend that are not obscured by the object and before the other vehicles enter the bend, wherein a driving speed of the other vehicles each falls below a predetermined locally permissible maximum speed for negotiating the bend;
   transmitting, by the vehicle to the computer unit, a position of the obscuring object;
   checking, by the computer unit, for a causal relationship between the detected speed behavior of the other vehicles and the obscuring object, wherein the checking is based on an assumption that the other vehicles are travelling at a significantly reduced driving speed than is necessary for negotiating the bend when a view of the bend is obscured; and
   determining, responsive to the checking that there is a causal relationship between the speed behavior of the other vehicles and the obscuring object, an average driving speed from driving speeds of the other vehicles for negotiating the bend, wherein the determined average driving speed is stored as a speed recommendation in a digital map and made available at least to vehicles coupled to the computer unit for data exchange.

2. The method of claim 1, wherein the determined average driving speed for negotiating the bend is fed to an assistance system for automated driving operation of at least the vehicle coupled to the computer unit for data exchange.

3. The method of claim 2, wherein, when a vehicle coupled to the computer unit for data exchange approaches the bend in automated driving operation, an indication of a subsequent reduction of a current driving speed of the vehicle is output in the vehicle.

4. The method of claim 1, wherein, in the region of the bend, the speed recommendation is transmitted by vehicle-to-vehicle communication to the other vehicles in surroundings of the vehicle.

* * * * *